US012075204B2

(12) United States Patent
Kasten et al.

(10) Patent No.: US 12,075,204 B2
(45) Date of Patent: *Aug. 27, 2024

(54) LOUDSPEAKER ACCESSORY TRAY

(71) Applicant: Robert Bosch GmbH, Stuttgart (DE)

(72) Inventors: Michael D. Kasten, Burnsville, MN (US); Andrew Grunloh, Columbia Heights, MN (US); Nicholas Sulzer, Mosinee, WI (US); Shawn Filipek, Savage, MN (US); Andrew Cho, Plymouth, MN (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,182

(22) Filed: Oct. 9, 2023

(65) Prior Publication Data

US 2024/0040292 A1 Feb. 1, 2024

Related U.S. Application Data

(63) Continuation of application No. 17/697,597, filed on Mar. 17, 2022, now Pat. No. 11,805,343.

(51) Int. Cl.
*H04R 1/02* (2006.01)

(52) U.S. Cl.
CPC ....... *H04R 1/025* (2013.01); *H04R 2201/029* (2013.01)

(58) Field of Classification Search
CPC .......................... H04R 1/025; H04R 2201/029
USPC .......................................................... 381/332
See application file for complete search history.

(56) References Cited

U.S. PATENT DOCUMENTS

| | | | |
|---|---|---|---|
| 3,203,502 | A | 8/1965 | Rife |
| 3,580,650 | A | 5/1971 | Morris |
| D247,652 | S | 3/1978 | Carroll et al. |
| 4,168,762 | A | 9/1979 | Griffin, Jr. |
| 4,941,841 | A | 7/1990 | Darden et al. |
| D315,736 | S | 3/1991 | Takagi |
| D359,492 | S | 6/1995 | Dyas |
| D408,682 | S | 4/1999 | Costa |
| D432,518 | S | 10/2000 | Muto |
| D433,673 | S | 11/2000 | Ito et al. |
| D439,238 | S | 3/2001 | Mackie et al. |
| D477,830 | S | 7/2003 | Hussaini et al. |
| D493,256 | S | 7/2004 | Kim |
| D496,352 | S | 9/2004 | Crook et al. |
| D507,258 | S | 7/2005 | Hussaini et al. |
| D524,244 | S | 7/2006 | Hussaini et al. |
| D536,331 | S | 2/2007 | Hussaini et al. |
| D550,650 | S | 9/2007 | Patel et al. |
| D565,549 | S | 4/2008 | Sawhney et al. |
| D568,294 | S | 5/2008 | Sawhney et al. |
| D568,872 | S | 5/2008 | Gonzalez |

(Continued)

FOREIGN PATENT DOCUMENTS

| | | |
|---|---|---|
| GB | 9002223925-0001 | 4/2013 |
| GB | 6206979 | 5/2022 |

*Primary Examiner* — Sean H Nguyen
(74) *Attorney, Agent, or Firm* — Michael Best & Friedrich LLP

(57) ABSTRACT

An accessory tray for a loudspeaker includes a main portion defining a perimeter and a base surface configured to support an accessory within the perimeter. An anchor portion extends under the base surface of the main portion, the anchor portion configured to engage a portion of the loudspeaker. The main portion has a tapering height from a rear to a front thereof, forming a rake angle in side view.

20 Claims, 9 Drawing Sheets

(56) References Cited

U.S. PATENT DOCUMENTS

| | | | |
|---|---|---|---|
| D575,271 | S | 8/2008 | Baird et al. |
| D579,443 | S | 10/2008 | Donovan et al. |
| D599,324 | S | 9/2009 | Shen |
| D601,546 | S | 10/2009 | Lee et al. |
| D609,216 | S | 2/2010 | Davies et al. |
| D611,452 | S | 3/2010 | Warden et al. |
| D642,555 | S | 8/2011 | Hawkins et al. |
| D654,474 | S | 2/2012 | Hawkins et al. |
| D674,371 | S | 1/2013 | Cho et al. |
| D682,255 | S | 5/2013 | Lum et al. |
| 8,515,180 | B2 | 8/2013 | Kato et al. |
| D691,591 | S | 10/2013 | Lum et al. |
| D695,717 | S | 12/2013 | Carpenter et al. |
| D698,336 | S | 1/2014 | Givre et al. |
| D723,506 | S | 3/2015 | Aglassinger |
| D741,795 | S | 10/2015 | Conrad et al. |
| D758,336 | S | 6/2016 | Kelly et al. |
| D771,590 | S | 11/2016 | Carbone et al. |
| D826,903 | S | 8/2018 | Yang et al. |
| D841,624 | S | 2/2019 | Nicolas et al. |
| 10,306,386 | B2 | 5/2019 | Warden et al. |
| D875,065 | S | 2/2020 | Lee et al. |
| D944,771 | S | 3/2022 | Combet |
| D961,931 | S | 8/2022 | McBride |
| 11,627,397 | B1 | 4/2023 | Filipek |
| 11,632,611 | B1 | 4/2023 | Sulzer et al. |
| 11,805,343 | B2 | 10/2023 | Kasten et al. |
| 2003/0174855 | A1 | 9/2003 | Hawkins et al. |
| 2008/0089547 | A1 | 4/2008 | Young et al. |
| 2011/0019854 | A1 | 1/2011 | Graber |
| 2012/0237058 | A1 | 9/2012 | Salomaa et al. |
| 2012/0250878 | A1 | 10/2012 | Ito |
| 2013/0177198 | A1 | 7/2013 | Hogue et al. |
| 2015/0201255 | A1 | 7/2015 | Porter |
| 2017/0127184 | A1 | 5/2017 | Mertel et al. |
| 2017/0156223 | A1 | 6/2017 | Fisher et al. |
| 2019/0307004 | A1 | 10/2019 | Fan et al. |
| 2021/0285562 | A1 | 9/2021 | Decker et al. |
| 2021/0396426 | A1 | 12/2021 | Nakagawa |

LOUDSPEAKER ACCESSORY TRAY

CROSS-REFERENCE TO RELATED APPLICATIONS

This application claims priority as a continuation of co-pending U.S. patent application Ser. No. 17/697,597, filed on Mar. 17, 2022, the entire contents of which are incorporated by reference herein.

BACKGROUND

The present invention relates generally to the field of loudspeakers such as those used in small and large venues for public address and/or delivery of a musical performance to an audience.

SUMMARY

In one aspect, the invention provides an accessory tray for a loudspeaker, the accessory tray including a main portion defining a perimeter and a base surface configured to support an accessory within the perimeter. An anchor portion extends under the base surface of the main portion, the anchor portion configured to engage a portion of the loudspeaker. The main portion has a tapering height from a rear to a front thereof, forming a rake angle in side view.

In another aspect, the invention provides an accessory tray for a loudspeaker. A main portion defines a base surface configured to support an accessory within a perimeter of the main portion, the perimeter including a raised edge extending above the base surface. An anchor portion is formed separately from the main portion and extending under the base surface of the main portion, the anchor portion configured to engage a portion of the loudspeaker. A plurality of fasteners secure the main portion to the anchor portion. The main portion has a rake angle of 3 to 15 degrees formed between the base surface and one or more loudspeaker-engaging contact surfaces formed on a bottom side opposite the base surface.

In yet another aspect, the invention provides a method of accessorizing a loudspeaker enclosure. The method includes providing the loudspeaker enclosure including a sound-projection front side and a top side adjacent the front side, and providing an accessory tray. The accessory tray includes a main portion defining a perimeter and a base surface configured to support an accessory within the perimeter, and an anchor portion extending under the base surface of the main portion. The anchor portion is engaged with the top side of the loudspeaker. The main portion and the anchor portion are secured together to fix a position of the accessory tray with respect to the loudspeaker enclosure. An accessory is positioned onto the base surface of the accessory tray main portion.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
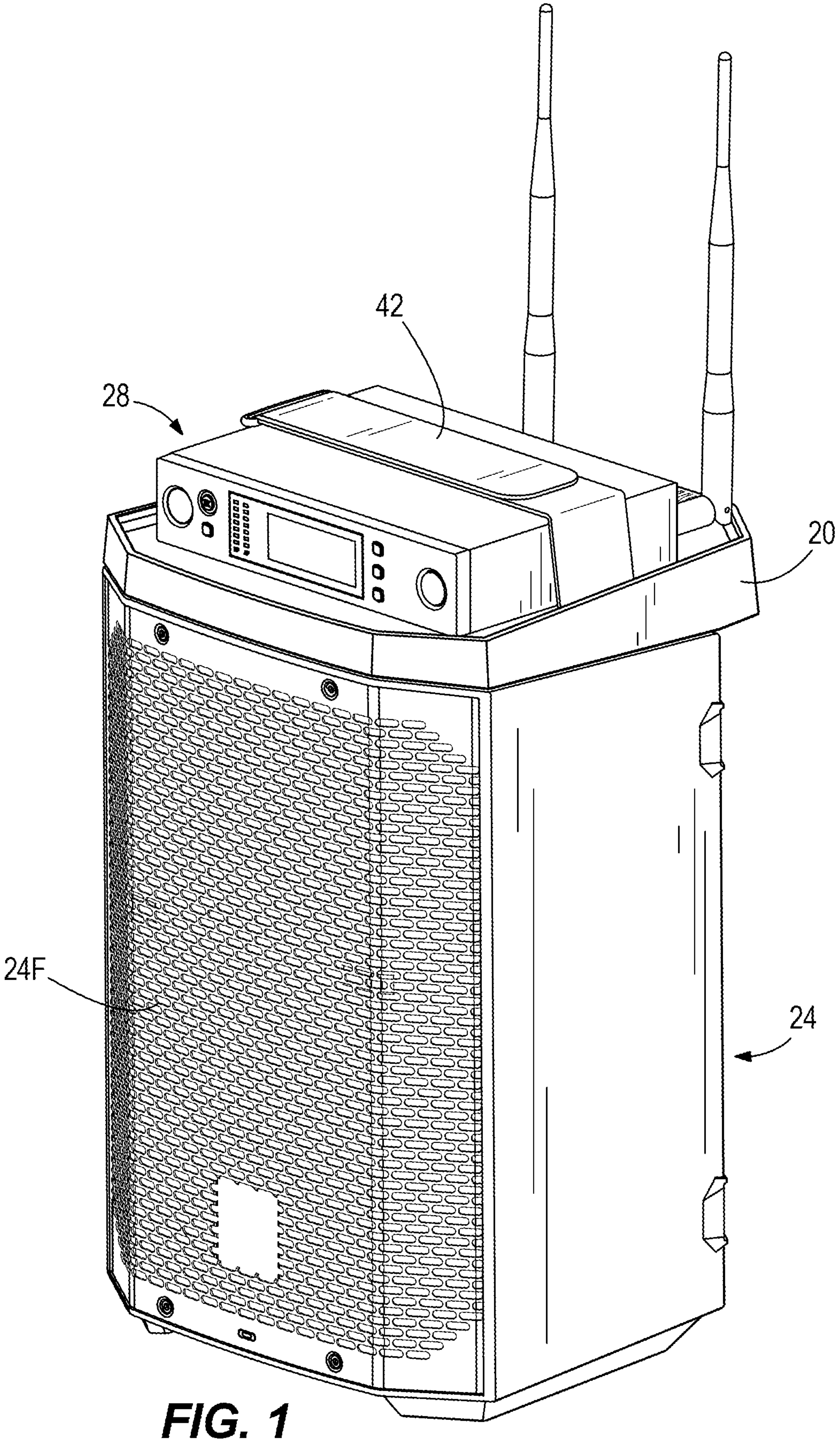
FIG. 1 is a perspective view of an accessory tray according to one embodiment of the present disclosure mounted to the top of a loudspeaker and supporting an accessory.
Figure 2:
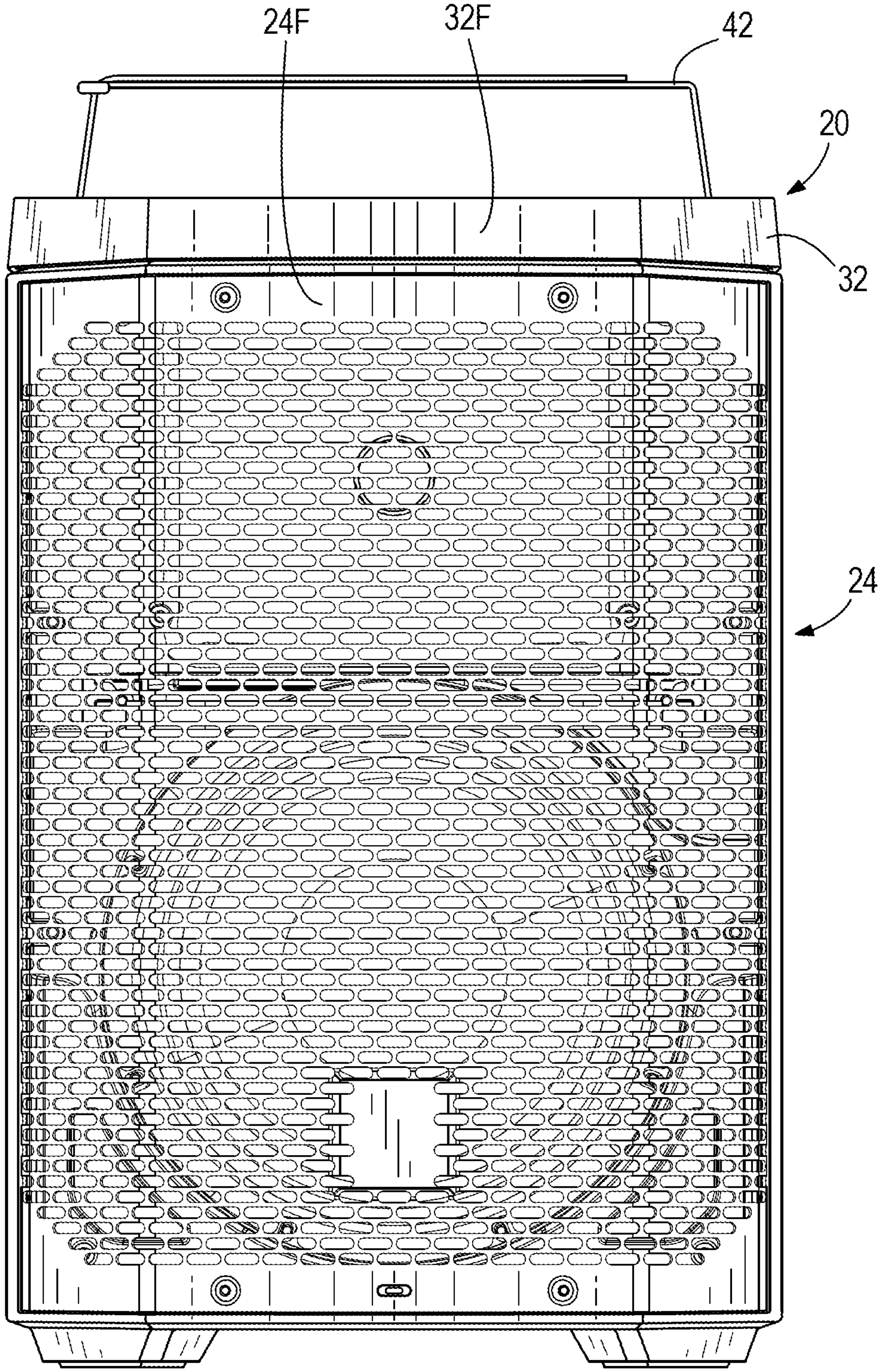
FIG. 2 is a front view of the mounted accessory tray of FIG. 1, shown here without the additional accessory.
Figure 3:
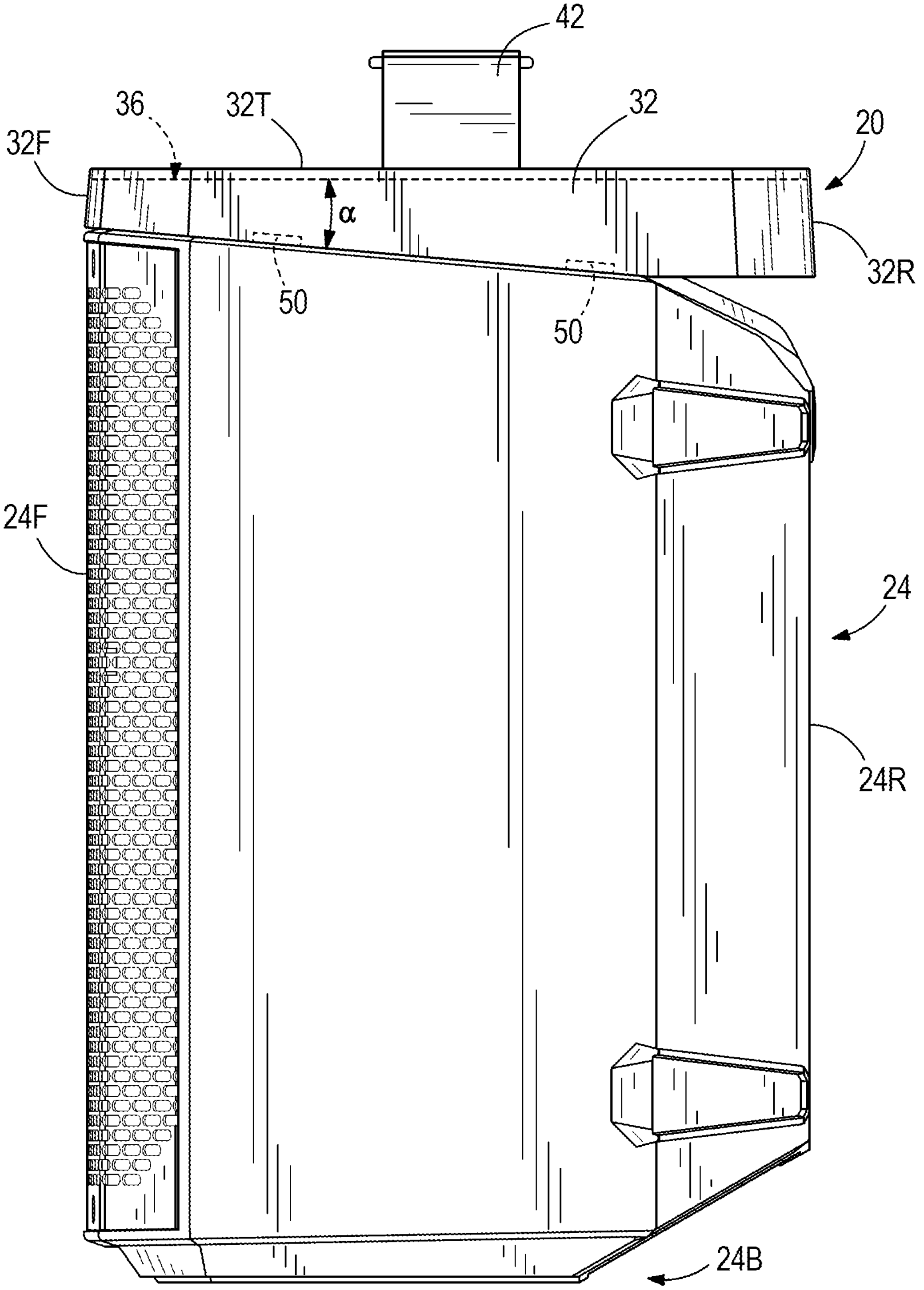
FIG. 3 is a right side view of the mounted accessory tray of FIG. 1, shown here without the additional accessory.
Figure 4:
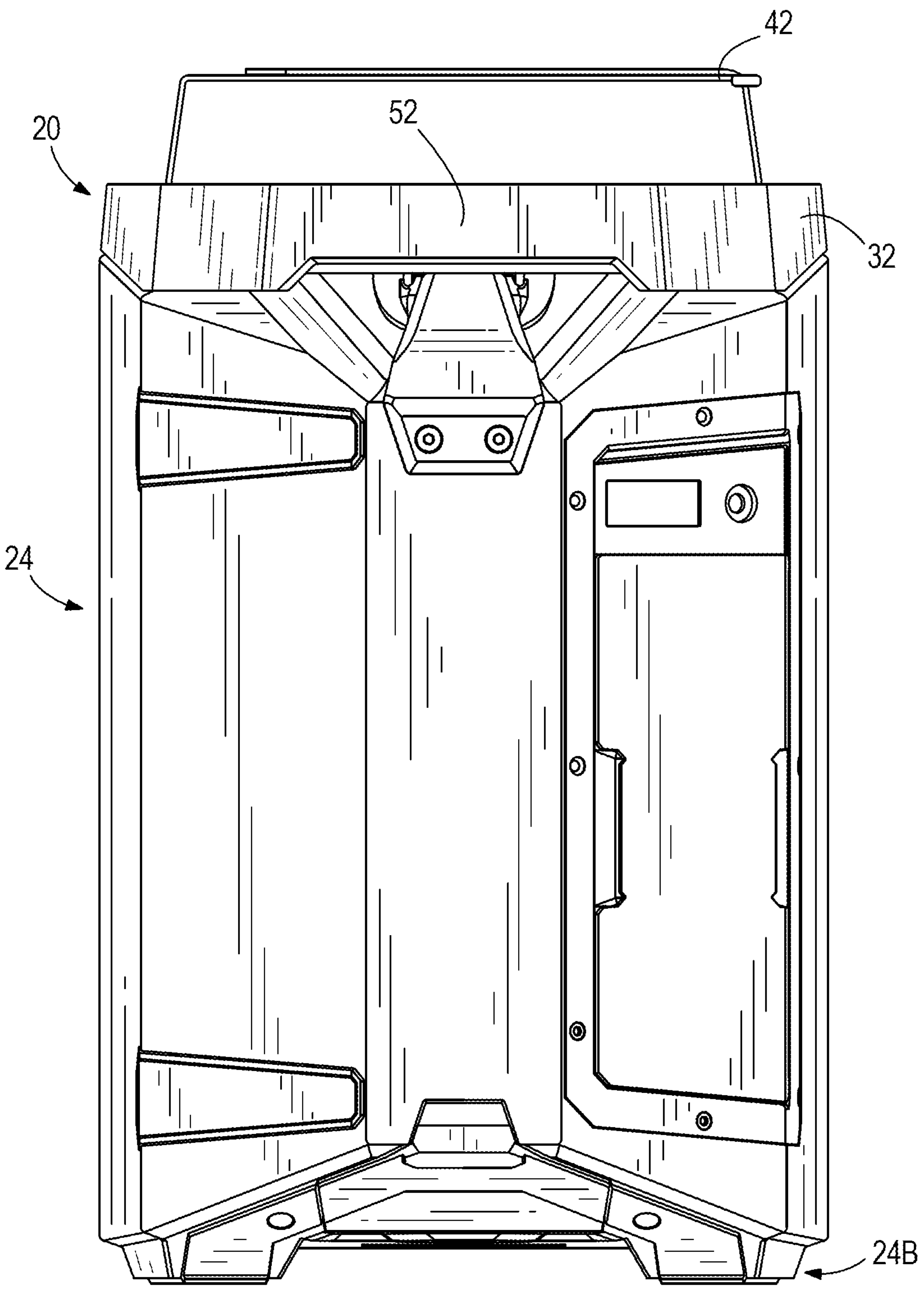
FIG. 4 is a rear view of the mounted accessory tray of FIG. 1, shown here without the additional accessory.

FIGS. 1-9 illustrates an accessory tray 20 for accessorizing a loudspeaker 24. As shown in FIG. 1, the accessory tray 20 can be removably secured to the top of the enclosure of the loudspeaker 24. Although a variety of accessories, both electronic and otherwise, can be accommodated by the accessory tray 20, FIG. 1 illustrates the accessory in the form of a wireless receiver 28, including a housing and at least one external antenna. The loudspeaker 24, which can contain multiple transducers for producing full-range sound to be emitted to an audience in a venue, can be connected in an electronic network with the wireless receiver 28. As such, the loudspeaker 24 (particularly the internal transducers therein) can receive signals to generate audio output from the wireless receiver 28 and/or one or more additional devices or instruments coupled to the wireless receiver 28. The accessory tray 20 transforms the loudspeaker 24 into a more conducive and secure location for receiving the wireless receiver 28 or other accessory(s).

Figure 5:
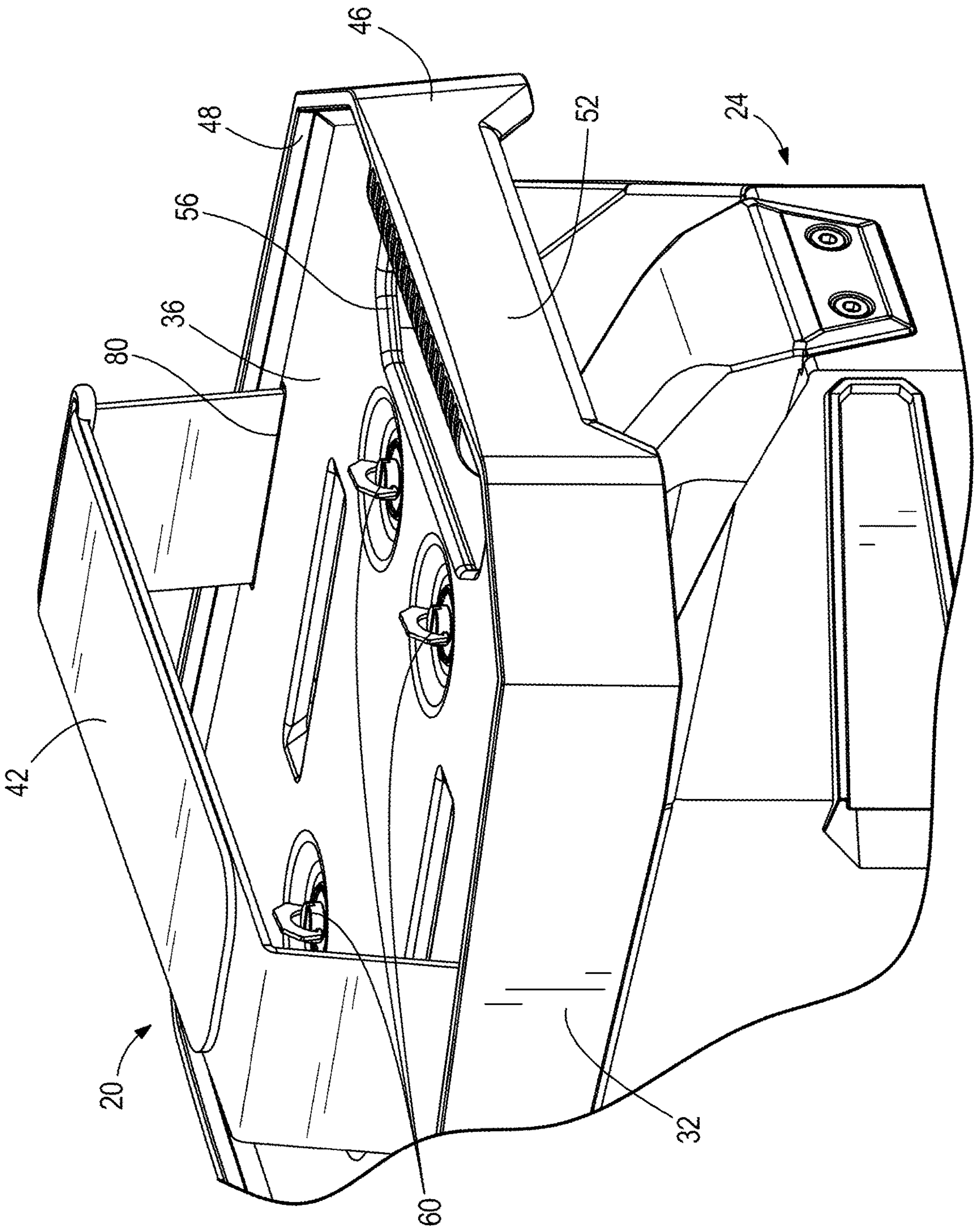
FIG. 5 is a rear perspective view of the mounted accessory tray of FIG. 1, shown here without the additional accessory.

As shown in FIG. 5, the accessory tray 20 includes a main portion 32 defining a receiving space for the accessory. For example, the main portion 32 includes a base surface 36. The base surface 36 can be flat across a substantial majority of its area (e.g., at least 60 percent, at least 75 percent, or at least 90 percent). In addition to the main portion 32, the accessory tray 20 includes an anchor portion 40 that is configured to interface directly with a portion of the enclosure of the loudspeaker 24, (e.g., being at least partially received into a concavity therein). In addition, the accessory tray 20 includes a strap 42 configured to secure an accessory to the base surface 36. Around the base surface 36, the main tray portion 32 includes a perimeter portion 46. As shown, the perimeter portion 46 can include a raised edge portion 48 that extends upwardly above the base surface 36. Thus, an accessory on the base surface 36 is impeded from sliding off the base surface 36, even if the loudspeaker 24 is put into a tilted orientation. Optionally, the base surface 36 can also be a non-slip surface. For example, the base surface 36 can be textured and/or covered in a high friction material such as rubber.

Figure 9:
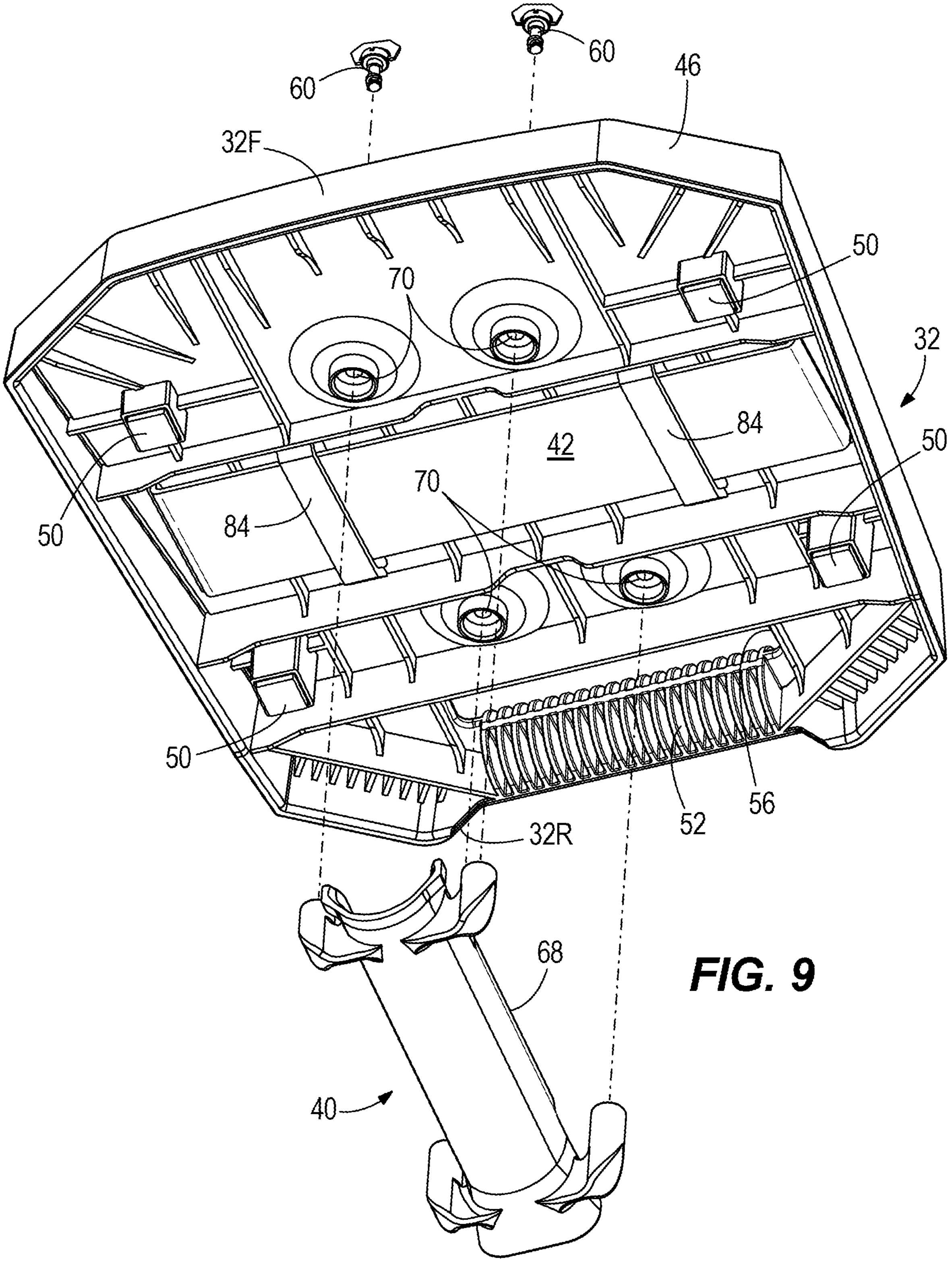
FIG. 9 is an exploded perspective view of all the parts of the accessory tray, taken from below.
Figure 10:
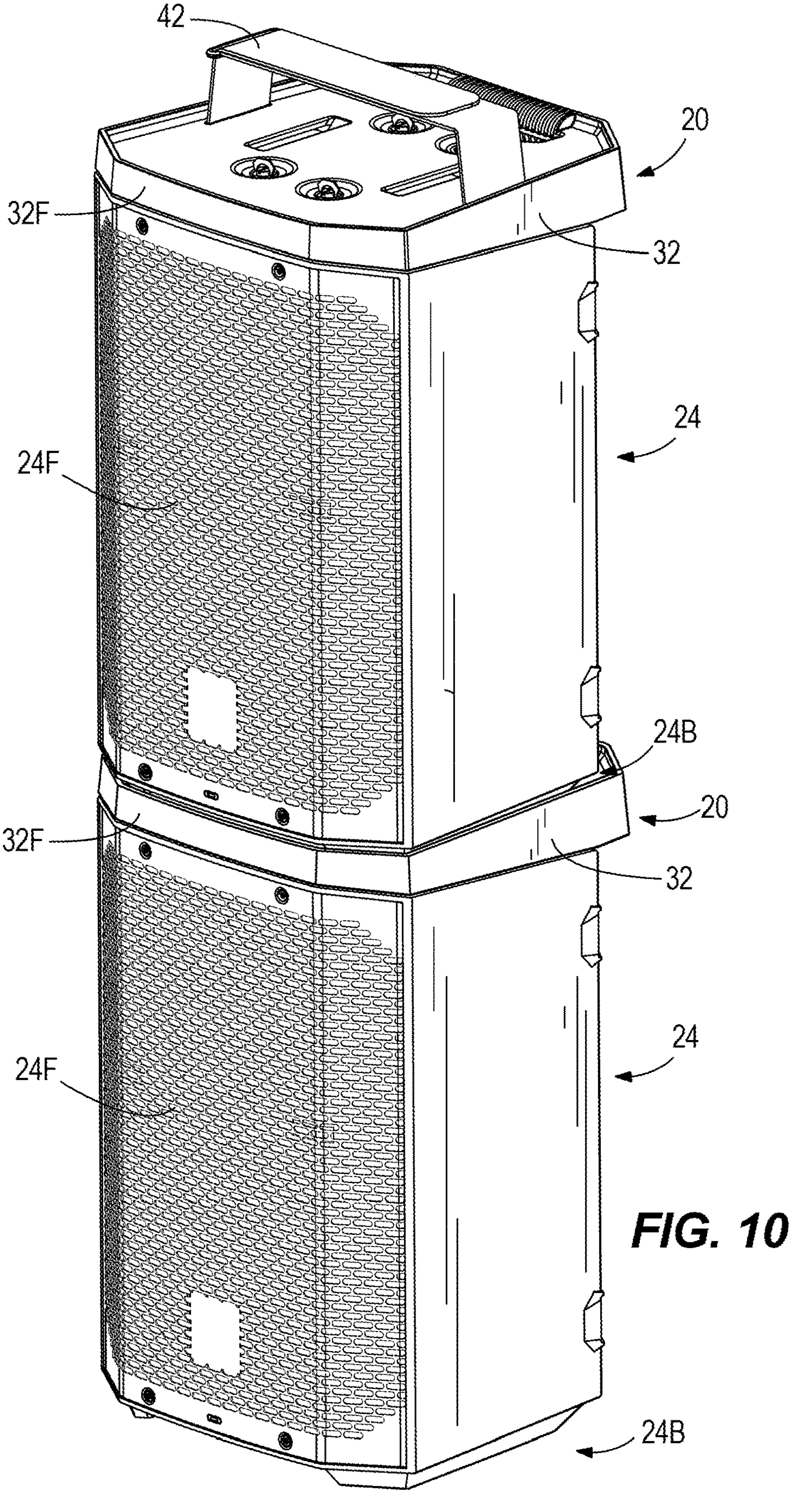
FIG. 10 is a perspective view illustrating the accessory tray used in a vertically stackable storage configuration for two loudspeakers.

In addition to providing a partially or predominantly flat surface for receiving an accessory, the base surface 36 is configured to be oriented horizontally when attached to the loudspeaker 24 with the loudspeaker 24 supported with its base or bottom end 24B on a horizontal support surface. This, despite a top side 24T of the loudspeaker 24 being angled with respect to the bottom end 24B and the horizontal support surface (e.g., at least 3 degrees, up to 15 or 20 degrees, for example 5 degrees). To accomplish the setting of the base surface 36 to the horizontal orientation when secured to the angled top side 24T of the loudspeaker 24, the accessory tray 20 has a rake angle $\alpha$, which can be observed from the side as in FIG. 3. The rake angle $\alpha$ can be measured between the base surface 36 and a bottom edge or surface(s) that interfaces with the top side 24T of the loudspeaker 24. In the illustrated construction, a plurality of disparate contact surfaces 50 (see also FIG. 9) are provided on the bottom of the main portion 32 of the accessory tray 20 for contacting the top side 24T of the loudspeaker 24. The rake angle $\alpha$ matches or is complementary with the rake angle of the loudspeaker top side 24T defined (in side view) with respect to a horizontal plane defined at the loudspeaker bottom end 24B. Thus, the rake in the accessory tray 20 serves to counteract or accommodate the non-horizontal orientation of the top side 24T as described above. A top surface 32T of the accessory tray main portion 32, if provided separate from the base surface 36, is parallel with the base surface 36 so that it is also set into the horizontal orientation when the loudspeaker 24 is supported in the upright orientation on a horizontal support surface. Thus, attaching the accessory tray 20 to the loudspeaker 24 forms an accessorized loudspeaker assembly that is vertically stackable (e.g., for storage) as shown in FIG. 10. The accessory tray main portion 32 has a first height at its front end as compared to a greater second height at its rear end. The accessory tray 20 thus transforms the loudspeaker 24, which is otherwise not vertically stackable due to the inherent rake angle $\alpha$ of the top side 24T.

Figure 6:
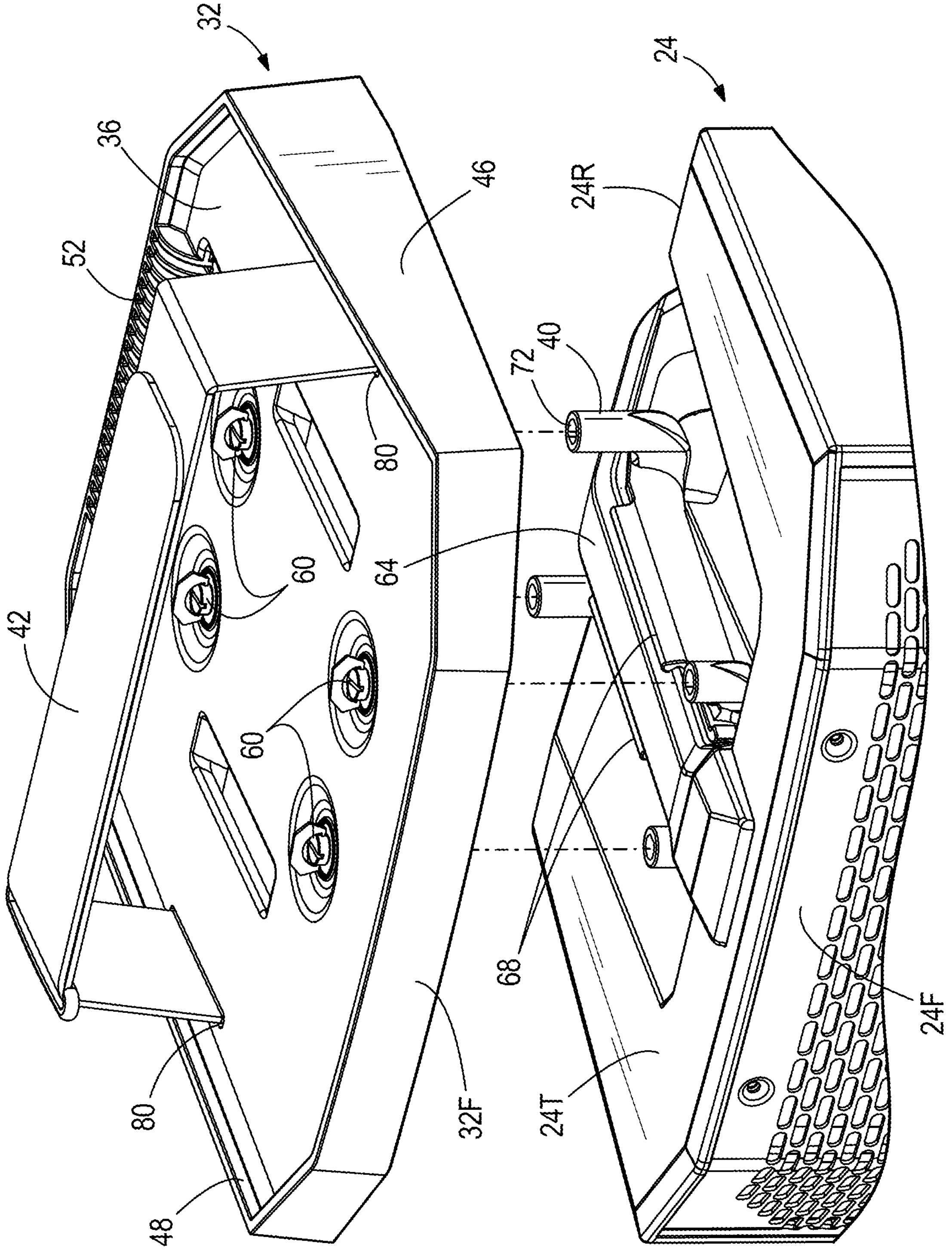
FIG. 6 is a partially exploded assembly view showing a main portion of the accessory tray removed from the top of the loudspeaker enclosure. An anchor portion of the accessory tray is mounted onto a handle at the top of the loudspeaker enclosure.
Figure 7:
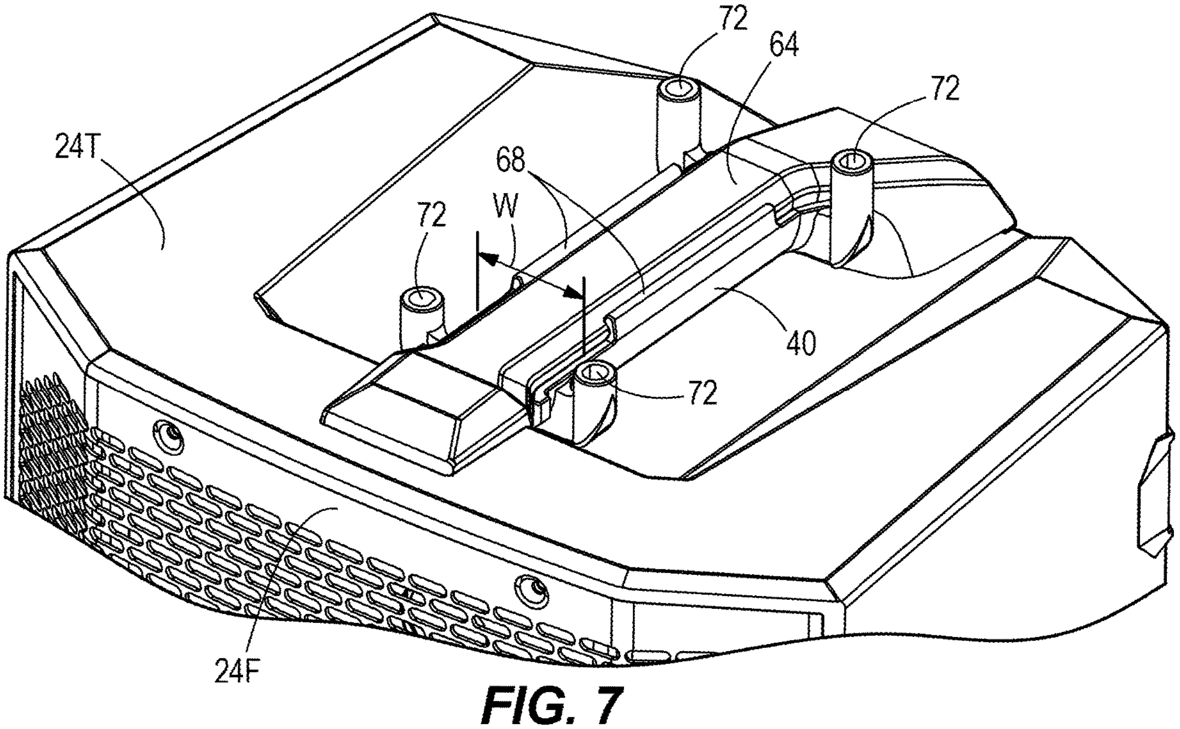
FIG. 7 is a detail perspective view of the anchor portion mounted on the loudspeaker handle.
Figure 8:
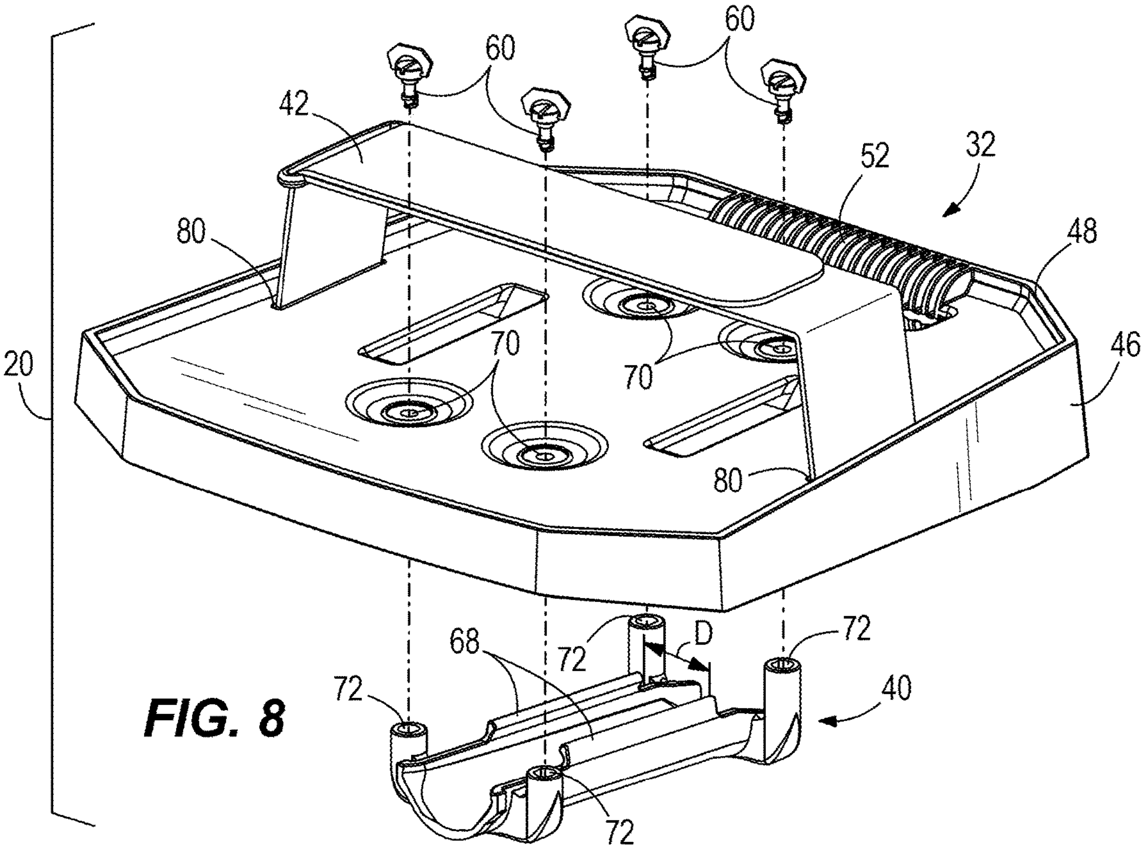
FIG. 8 is an exploded perspective view of all the parts of the accessory tray, taken from above.

With further reference to FIG. 5, the main portion 32 includes a handle 52 located along the perimeter portion 46. Within the perimeter portion 46, an aperture 56 is formed through the base surface 36 at a location of the handle 52. Thus, a user may put their hand through the aperture 56 to grasp around the handle 52. As shown in FIGS. 6 and 7, the accessory tray 20 can be assembled by securing the main portion 32 and the anchor portion 40 together with a plurality of fasteners 60 (e.g., threaded fasteners such as thumb screws) so that a portion of the loudspeaker 24 is entrapped therebetween. As shown, the accessory tray 20 can be mounted to a handle 64, the handle being provided on the top side 24T of the loudspeaker 24. Thus, the loudspeaker handle 64 may be rendered partially or wholly inoperative by the attachment of the accessory tray 20, and the handle 52 of the accessory tray 20 acts as a surrogate handle for picking up or otherwise manipulating the entire assembly once the tray 20 is mounted to the loudspeaker 24.

With reference to FIGS. 6 to 9, the anchor portion 40 can be more readily observed. In FIGS. 6 and 7, the anchor portion 40 is shown in a coupled state with the loudspeaker handle 64, prior to a step of securing the anchor portion 40 to the main portion 32 with the fasteners 60. The anchor portion 40 can be mounted in a self-stable manner on an underside of the loudspeaker handle 64 via an interference fit. For example, the interference fit may be provided by a pair of opposed detent tabs 68 that can be situated along opposite sides of the loudspeaker handle 64. In a natural, unflexed state, a spacing distance D (FIG. 8) between the detent tabs 68 can be smaller than a width W (FIG. 7) measured between the two opposite sides of the loudspeaker handle 64. The detent tabs 68 can have rounded or barbed edges for engagement with edges of the loudspeaker handle 64. Between the detent tabs 68, the anchor portion 40 can have a concave shape to receive all or a majority of the loudspeaker handle 64 when attached. Further, the anchor portion 40 can include a plurality of fastener receiving portions 72. The fastener receiving portions 72 can be provided in the form of bosses or blocks with blind or through holes for receiving the respective fasteners 60. The fastener receiving portions 72 are provided at each of four corners of the anchor portion 40 for a total of four portions 72. However, the anchor portion 40 can have as few as one fastener receiving portion 72 depending upon the configuration and the nature of attachment with the main portion 32. For example, a fastener may extend through a portion of the loudspeaker handle 64 in an alternate construction. With the anchor portion 40 and the main portion suitably attached, the accessory tray 20 can be securely fixed with the loudspeaker 24 and thus immovable with respect to the loudspeaker 24. In some constructions, the accessory tray 20 may be movable (e.g., slidable) within a finite range of positions. For example, the accessory tray 20 can be movable along the loudspeaker handle 64, exclusively prior to securement by the fasteners 60, to allow the user to select a preferred position of the accessory tray 20.

Turning to the strap 42 that secures the accessory to the base surface 36, the strap material can be flexible and either constructed with elastic material or otherwise configured to be adjustably tightened. For example, the strap 42 can include hook-and-loop (e.g., VELCRO®) closure materials, a buckle and multiple buckle receiving holes, one or more snaps, etc. As shown, the strap 42 is configured to be entirely positioned within the perimeter portion 46 of the main tray portion 32. For example, the strap 42 can include separate strap anchor ends that are tethered to the main tray portion 32 at opposite sides thereof. The strap 42 can consist of a single continuous material or can alternately include a plurality of (e.g., two) distinct portions securable together. A portion or portions of the strap 42 can extend below the base surface 36 (e.g., through respective apertures or slots 80) and may extend along a bottom side of the main tray portion 32. As shown in FIG. 9, the strap 42 can extend through one or more strap guides 84 formed in the bottom side of the main tray portion 32. The strap 42 can be operated (repeatably and non-destructively) between open and closed configurations that enables installation and removal of one or more accessories such as, for example, the wireless receiver 28.

Various features of the invention are set forth in the claims below.

What is claimed is:

1. An accessory tray for a loudspeaker, the accessory tray comprising:

a main portion defining a perimeter and a base surface configured to support an accessory within the perimeter; and an anchor portion extending under the base surface of the main portion, the anchor portion configured to engage a portion of the loudspeaker.

2. The accessory tray of claim 1, wherein the anchor portion is formed separate from the main portion and secured thereto by a plurality of threaded fasteners.

3. The accessory tray of claim 2, wherein the anchor portion has a concave shape configured to receive a handle of the loudspeaker and includes pair of opposed detent tabs configured for engagement with edges of the handle of the loudspeaker.

4. The accessory tray of claim 2, further comprising an adjustable length strap coupled to the main portion and configured to retain the accessory to the base surface.

5. The accessory tray of claim 4, wherein the adjustable length strap includes hook-and-loop attachment portions.

6. The accessory tray of claim 1, wherein the main portion includes a handle located along the perimeter.

7. The accessory tray of claim 6, wherein within the perimeter of the main portion, an aperture is formed through the base surface at a location of the handle of the main portion.

8. An accessorized loudspeaker assembly comprising:

a loudspeaker enclosure including a sound-projection front side and a top side adjacent the front side; and the accessory tray of claim 1 coupled to the top side of the loudspeaker enclosure via engagement of the anchor portion with a handle formed in the top side of the loudspeaker enclosure.

9. The accessorized loudspeaker assembly of claim 8, wherein the accessory tray includes a front side extending along the front side of the loudspeaker enclosure and following a contour thereof, and wherein the accessory tray includes a rear side including a handle extending along a rear side of the loudspeaker enclosure.

10. The accessorized loudspeaker assembly of claim 8, wherein the anchor portion defines an interference fit with the handle.

11. An accessory tray for a loudspeaker, the accessory tray comprising:

a main portion defining a base surface configured to support an accessory;

an anchor portion extending under the base surface of the main portion, the anchor portion configured to engage a top handle of the loudspeaker; and an adjustable length strap coupled to the main portion and configured to retain the accessory to the base surface.

12. The accessory tray of claim 11, wherein the anchor portion has a concave shape configured to receive the top handle of the loudspeaker and includes pair of opposed detent tabs configured for engagement with edges of the top handle of the loudspeaker.

13. The accessory tray of claim 11, wherein the adjustable length strap includes hook-and-loop attachment portions.

14. The accessory tray of claim 11, wherein the main portion includes a handle located along a perimeter of the main portion.

15. The accessory tray of claim 14, wherein within the perimeter of the main portion, an aperture is formed through the base surface at a location of the handle of the main portion.

16. An accessorized loudspeaker assembly comprising:

a loudspeaker enclosure including a sound-projection front side and a top side adjacent the front side, the top side including the top handle; and the accessory tray of claim 11 coupled to the top side of the loudspeaker enclosure via engagement of the anchor portion with the top handle.

17. The accessorized loudspeaker assembly of claim 16, wherein the accessory tray includes a front side extending along the front side of the loudspeaker enclosure and following a contour thereof, and wherein the accessory tray includes a rear side including a handle extending along a rear side of the loudspeaker enclosure.

18. A method of accessorizing a loudspeaker enclosure, the method including:

providing the loudspeaker enclosure including a sound-projection front side and a top side adjacent the front side, the top side having a handle;

providing an accessory tray including:

a main portion defining a perimeter and a base surface configured to support an accessory within the perimeter, and an anchor portion extending under the base surface of the main portion;

engaging the anchor portion with the handle at the top side of the loudspeaker; and positioning an accessory onto the base surface of the accessory tray main portion.

19. The method of claim 18, further comprising securing the accessory to the base surface with an adjustable length strap.

20. The method of claim 18, wherein the anchor portion is engaged with the handle by an interference fit between the anchor portion and the handle.

* * * * *